US007565484B2

(12) United States Patent
Ghosal et al.

(10) Patent No.: US 7,565,484 B2
(45) Date of Patent: *Jul. 21, 2009

(54) METHODS, APPARATUS AND COMPUTER PROGRAMS FOR SCHEDULING STORAGE REQUESTS

(75) Inventors: Sugata Ghosal, New Delhi (IN); Rohit Jain, New Dehli (IN); Akshat Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/776,578

(22) Filed: Jul. 12, 2007

(65) Prior Publication Data

US 2008/0016310 A1      Jan. 17, 2008

Related U.S. Application Data

(63) Continuation of application No. 10/874,857, filed on Jun. 23, 2004, now Pat. No. 7,277,984.

(51) Int. Cl.
*G06F 12/00* (2006.01)
(52) U.S. Cl. .................. 711/112; 711/100; 711/111; 711/113; 711/115; 711/4; 710/1; 710/5; 710/6; 710/36; 710/39; 710/42
(58) Field of Classification Search ........... 711/100, 711/111–112, 113, 115, 4; 710/1, 5–6, 36, 710/39, 40, 42
See application file for complete search history.

(56) References Cited

U.S. PATENT DOCUMENTS

| 5,644,786 | A | 7/1997 | Gallagher et al. |
| 5,729,718 | A | 3/1998 | Au |
| 5,828,902 | A * | 10/1998 | Tanaka et al. ............. 710/39 |
| 6,553,454 | B1 | 4/2003 | Harada |
| 6,574,676 | B1 | 6/2003 | Megiddo |
| 7,277,984 | B2 * | 10/2007 | Ghosal et al. ............. 711/112 |

OTHER PUBLICATIONS

Bruno, J., Brustoloni, J., Gabber, E., Ozden, B., Silberschatz, A., "Disk Scheduling with Quality of Service Guarantees", In *Proc. Int'l Conference on Multimedia Computing and Systems*, 1999.
Bruno, J., Gabber, E., Ozden, B., and Silberschatz, A., "Move-To-Rear List Scheduling: a new scheduling algorithim for providing QoS guarantees", In *Proc of 5th ACM International Conference on Multimedia*, 1997, pp. 63-73, Seattle, Washington, U.S.
Bosch, P., and Mullender, S.J., "Real-Time Disk Scheduling in a Mixed-Media File System", In *6th Real-Time-Technology and Application Symp.* (RTAS), 2000, pp. 23-32, Washington, DC.
Iyer, S., and Druschel, P., "Anticipatory Scheduling: A disk scheduling framework to overcome deceptive idleness in synchronous I/O", In *Proc. Symposium of Operating Systems Principles 2001*, pp. 117-130.

(Continued)

*Primary Examiner*—Tuan V Thai
*Assistant Examiner*—Zhuo H Li
(74) *Attorney, Agent, or Firm*—Gibb I.P. Law Firm, LLC

(57) ABSTRACT

Provided are methods, apparatus arid computer programs for scheduling storage input and/or output (I/O) requests. A method for scheduling storage access requests determines a request processing sequence calculated to maximize SLA-based revenues achievable from processing a number of requests. A storage controller includes a scheduler which implements a revenue-based scheduling function to determine a revenue-maximizing processing sequence, and then assigns storage access requests to locations in a queue corresponding to the determined sequence. In an on-line mode, the scheduler can adapt to additional received requests, evaluating the revenue function for the additional requests and modifying the schedule if required. The method may include analyzing a request stream to predict requests that are likely to be received in the near future, and taking account of the predicted requests when determining a processing schedule.

19 Claims, 4 Drawing Sheets

OTHER PUBLICATIONS

Lund, K., and Goebel, V., "Adaptive Disk Scheduling in a Multimedia DBMS", *ACM Multimedia 2003*, pp. 65-74, Berkeley, California, 2003.

Mokbel, M.F., Aref, W.G., El-Bassyouni, K., and Kamal, I., "Scalable Multimedia Disk Scheduling", In. Proc *IEEE International Conference on Data Engineering*, 2004.

Reddy, A.N., and Wyllie, J., "Disk scheduling in multimedia I/O system", In *Proc. Of ACM Multimedia*, 1993, pp. 225-234.

Seltzer, M., Chen, P., and Ousterhout, J., "Disk Scheduling Revisited", In *Proc. Of the USENIX Winter 1990 Technical Conference*, 313-324.

Shenoy, P., and Vin, H.M., "Cello: A Disk Scheduling Framework for Next Generation Operating Systems", In *Proc. of ACM SIGMETRICS*, 1998, 44-55.

\* cited by examiner

PRIOR ART

METHODS, APPARATUS AND COMPUTER PROGRAMS FOR SCHEDULING STORAGE REQUESTS

CROSS-REFERENCE TO RELATED APPLICATIONS

This application is a continuation of U.S. application Ser. No. 10/874,857 filed Jun. 23, 2004, issued Oct. 2, 2007 as U.S. Pat. No. 7,277,984, the complete disclosure of which, in its entirety, is herein incorporated by reference.

FIELD OF INVENTION

The present invention relates to methods, apparatus and computer programs for scheduling storage input and/or output (I/O) requests.

BACKGROUND

The cost of managing storage systems has gone up drastically in recent years. These cost increases are due to the increasing complexity of such systems—required to cope with an increase in the rate of data growth and demands on performance, reliability and availability. As a result, there is a growing trend towards outsourcing of storage to managed storage service providers (SSPs). The providers host die customer's data on large-scale consolidated storage systems that are based on a networked architecture typically consisting of servers, switches, disk array controllers, caches, and disks, and often referred to as storage area networks (SANs). FIG. 1 shows a typical SAN 50 A comprising storage servers 10, storage devices 30 and interconnecting switches 20.

Traditionally, attempts to optimize enterprise storage have focussed on reducing the cost of storage solutions. However in a SSP scenario, "best effort" service from low cost solutions may be unacceptable—elaborate Service Level Agreements (SLAs) specifying quality of service (QoS) guarantees and revenue parameters may be agreed between the provider and the customers. The SSP's resources are shared among applications and/or customers with different QOS requirements and associated rewards and penalties. The resources must be allocated and work scheduled in such a way that all customers are satisfied. One aspect of this problem is the scheduling of execution of I/O requests that arrive at a magnetic hard disk in a provider's system.

Various scheduling algorithms have been proposed for scheduling disk read arid write operations in non-SSP environments. Typically, these methods are non-predictive—looking only at requests that have already been received—and the generated schedules and allocation of resources do not take account of the relative importance of each request to the profits and revenues of a storage service provider.

Most of the previous work on disk scheduling has focussed on optimizing the time that the disk head spends in moving to the right position to service the requests and/or meeting the deadlines of real-time workloads. Among the most well-known are the ones that optimize the seek: SSTF (shortest seek-time first), SCAN, C-SCAN (circular SCAN); and ones that optimize both seek and rotation: STF (shortest time first), and its variants like GSTF (grouped shortest time first). The real-time scheduling algorithms were mostly developed for servicing multimedia workloads. They include EDF (earliest deadline first) and variants such as SCAN-EDF and SSEDV (shortest seek and earliest deadline by value) that optimize seek and rotational latency while still meeting the request deadlines. These algorithms do not take into account the priority or profits associated with a request while making scheduling decisions. Thus, they are fundamentally incapable of providing profit- or revenue-differentiated QoS or maximizing profits in a service provider setting.

More recently, some algorithms have been proposed that can support diverse QOS classes. Bruno et al. "Disk Scheduling with Quality of Service Guarantees Proceedings of International Conference on Multimedia Computing and Systems, 1999, proposed a proportional share scheduler, YFQ, that enables applications to reserve portions of disk bandwidth. YFQ can provide QoS guarantees at individual application level, but YFQ is unsuitable in a service provider setting because the scheduler does not support rewards that arc independent of the disk usage shares.

A disk scheduling framework is described by Shenoi et al, in "Cello: A Disk Scheduling Framework for Next Generation Operating Systems", Proceedings of ACM SIGMETRICS, 1998, pages 44-55. The Cello disk scheduling framework employs a two level scheduler with a top level proportional share scheduler assigning disk shares to low level schedulers that can use different scheduling techniques depending on the workload type. However, Cello does not provide for revenue or profit maximization for the same reasons as YFQ.

Such methods have provided advantages, but no scheduling techniques have been described which are satisfactory to optimize profits or revenues in a storage service environment.

SUMMARY

A first embodiment of the invention provides a method for scheduling storage access requests, which determines a request processing sequence calculated to maximize SLA-based revenues achievable from processing a number of requests. One embodiment of the invention provides a scheduler for a storage controller which implements a revenue-based scheduling function to determine a revenue-maximizing processing sequence and then assigns storage access requests to locations in a queue corresponding to the determined sequence.

In one embodiment, revenue maximization is defined as minimization of the loss of revenue resulting from processing latency for the plurality of storage access requests. If SLA-based revenues for processing storage I/O requests are dependent on the latency with which the requests are served, revenues will be reduced whenever the latency is sufficiently high. A loss of revenue for an individual request, r, that is served with latency d is defined as the difference between the revenue generated by r when served with zero latency and the revenue generated when r is served with latency d. Revenue maximization then corresponds to minimization of accumulated revenue loss (ARL) for a set of requests.

In this specification, the words 'profit' and 'revenue' are used interchangeably, and generally refer to the payments due to a service provider for their services of processing storage access requests (for example, the revenue achievable after any SLA-defined penalties have been deducted from SLA-defined rewards for processing storage access requests). In a service level agreement (SLA), revenues may be earnt according to the number of requests processed, the data type, the amount of data processed per request, and processing latency, for example. Explicit penalties may be related to latency and failures, for example, but in many cases the 'penalty' is merely a lower revenue. The parameters and associated revenues and penalties set out in a SLA may vary between a SSP's customers. The SLA-based revenues achievable for processing storage access requests may be defined in the SLA itself or separately.

A method according to an embodiment of the invention employs revenue-based QoS differentiation, determining a schedule for processing storage access requests to maximize the revenues earned from serving the requests. Such a method may be implemented to use any one or a plurality of different revenue functions.

One embodiment of the present invention provides a predictive scheduling method that generates a schedule using predictions of requests that will arrive in the future. Such an embodiment, and other non-predictive embodiments, may be implemented in an adaptive (or 'online') mode which modifies a schedule in response to the arrival of new requests. The invention may also be implemented in an off-line mode, scheduling a set of received requests to read data from or write data to a storage device or storage service.

A scheduler according to one embodiment of the invention determines a revenue-optimizing schedule using a latency-dependent revenue function and each request's arrival time together with the physical location of the relevant data on the disk. The location relative to the data of previous requests is used to estimate the 'seek time' for moving to the correct track of a storage disk. This estimate may then be adjusted by adding an estimate of the 'rotational delay' for moving to the correct track sector. The scheduler may also take account of the size of each data request, to estimate the time required to process the request ('transfer' time).

A further embodiment of the invention provides a storage-access controller comprising a request scheduler for controlling the processing sequence of customers' storage access requests sent to a storage service provider (SSP). The request scheduler generates a schedule of storage access requests for processing by a storage system, applying a revenue function to determine the request processing sequence that will generate the highest possible revenue based on the rewards and/or penalties of the SSP's SLAs with the customers.

A classifier may be provided to analyze received requests and output classification information which is used by the scheduler to determine respective SLA-based revenues.

The controller according to one embodiment also includes a predictor that uses request-stream characteristics for generating a prediction of the storage access requests that will be received by the storage system. The predictor provides this prediction to the scheduler for use when generating the access request schedule.

Methods, storage request schedulers and disk controllers according to one embodiment of the invention can implement optimizations such as serving all requests on the same disk track before moving to other tracks. Another embodiment involves serving any requests for data on intervening tracks, when a read/write head moves between two tracks, before completing the move to the more distant target track.

A method or storage request scheduler as described above may he implemented in computer program code for controlling operations of a data processing apparatus on which the code executes, and may be made available as a program product comprising program code recorded on a recording medium.

BRIEF DESCRIPTION OF DRAWINGS

One or more embodiments of the invention are described below in more detail, by way of example, with reference to the accompanying drawings in which.

DETAILED DESCRIPTION OF EMBODIMENTS

Figure 1:
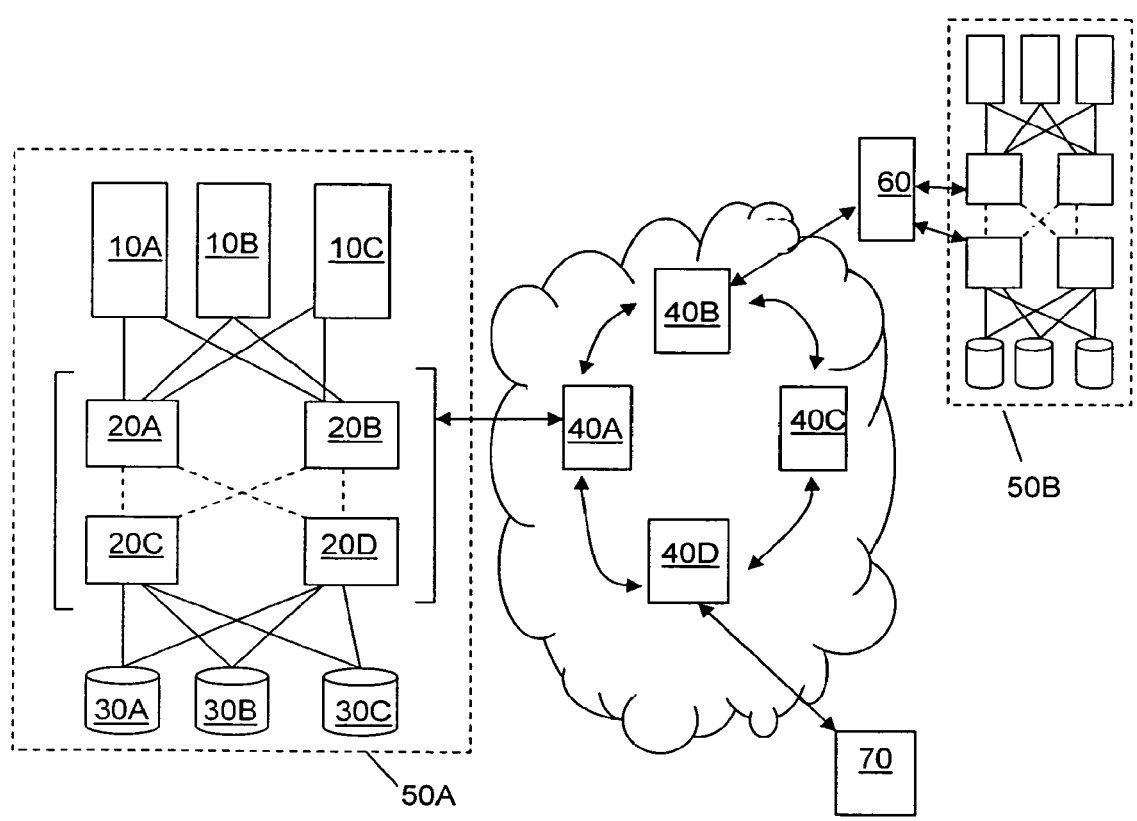
FIG. 1 is a schematic representation of a network configuration including storage area networks.

FIG. 1 shows an example storage network configuration. A first storage area network (SAN) 50 A comprises a number of storage servers 10 and a set of storage devices 30 (for example, arrays of disk drives or tape libraries). The storage servers 10 each connect to the storage devices 30 via a set of interconnected switches 20. The storage servers 10 may each include, for example, an iSCSI controller or iSCSI adapter for transferring block-level data across an IP network. The switches may be Ethernet switches implementing a combination of iSCSI interfaces and other storage interfaces such as SCSI or FibreChannel.

A SAN interconnection provides connectivity to other storage area networks 50 B via server systems 40 of a wide area network (WAN) or metropolitan-area-network (MAN), connecting to some SANs via a respective storage router 60. The switches and routers provide multi-protocol connectivity together with storage-specific functionality (such as peer-to-peer copy commands).

In a storage service provider scenario, different types of data (text/html files, image files, audio/video files, database tables etc) having different QoS requirements and data having different SLA revenues may be stored on the same disk. Also, multiple customers having different SLAs may share disks to achieve benefits of scale. This is especially true for the large number of small businesses that outsource all their computing infrastructure requirements. Another very common scenario in which disks are shared is when disks are caches for a storage area network (SAN). For reasons of performance, such caches are needed when data is spread across a large SAN.

A Storage service is provided by a storage system that typically consists of a set of magnetic storage based hard disk drives 30 that are connected over a local network. The following description refers to data stored in a disk drive and describes data access delays with reference to track seek times. However, it will be clear to persons skilled in the art that other storage devices may be used, such as tape storage. A disk controller is described below as an example of a storage access controller in which the invention may be implemented. An individual customer wishing to access a data store within the storage devices 30 of a SAN 50 establishes a connection between the customer's client system 70 and a WAN server 40. The WAN server 40 accesses the storage device 30 via a switch 20 and a storage server 10 within the SAN 50. The storage service model is described below in more detail.

Storage Service Model

Figure 2:
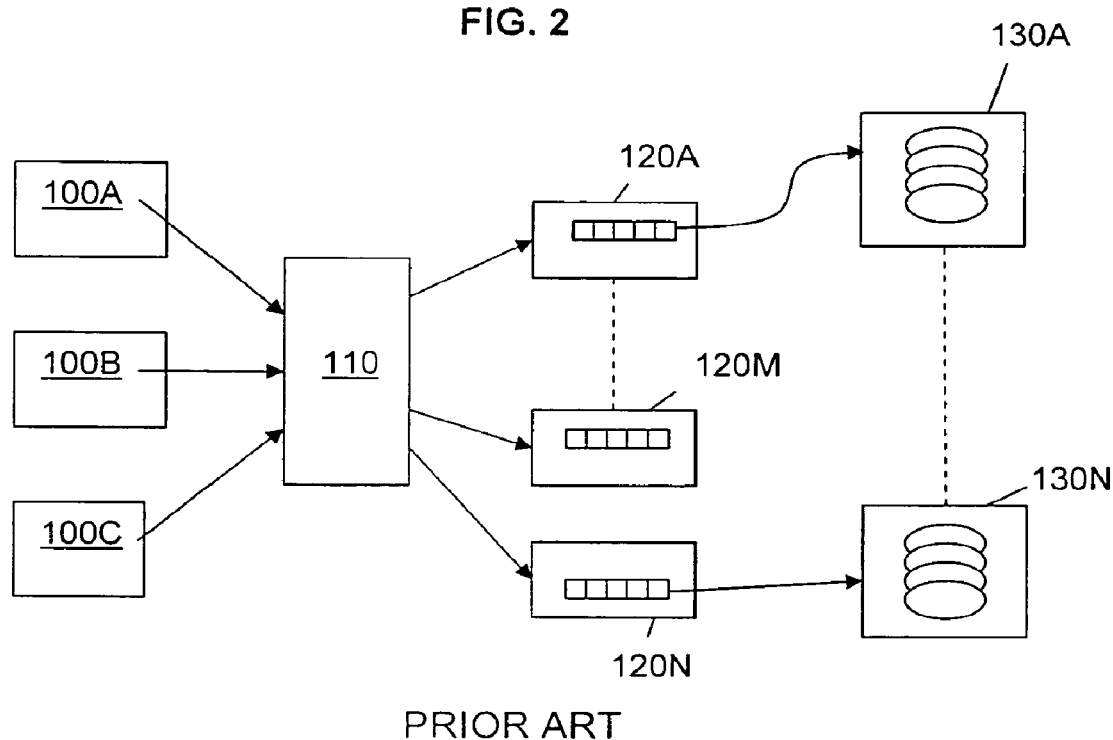
FIG. 2 is a schematic representation of a storage service layout of a storage service provider.

FIG. 2 provides an abstract representation of a storage service layout. A request stream is defined as an aggregation of all I/O requests from a customer 100, or a customer class, and a data store is defined as a logical grouping of data that is accessed by the stream. The service provider distributes the stores across a number of different disk drives 130 to achieve a physical storage arrangement that satisfies a number of objectives. For example, a store may be replicated on multiple disk drives to satisfy reliability requirements. A front-end dispatcher 110 may be used to route the incoming I/O requests of a stream to one of the disk drives 130 that contains the target store of the request. Access to each disk drive is controlled by a disk controller 120 that performs translation of a request into a format that corresponds to the disk drive geometry (specifying cylinder, head, track and sector).

The disk controller 120 maintains a queue of outstanding requests, and schedules them for execution in a fashion such that an objective function is optimized. C-SCAN is one example of a known scheduling algorithm used to minimize overall disk head movement.

A magnetic hard disk drive 130 has a number of discs, called platters, that have their circular surfaces coated with a magnetic recording medium. The planers are arranged on a spindle in a cylindrical stack. Each magnetic surface coating consists of numerous concentric circles, called tracks, that record the data. Each track is further divided into a number of sectors which are the unit of read or write to the disk drive. The data is recorded and retrieved by electromagnetic read/write heads mounted on a slider and attached to a mechanical arm which is positioned over the tracks by an actuator. A hard disk drive is often referred to as a 'disk' for simplicity, and this convention has been used below.

The time it takes to service a disk I/O request is the total of seek time (time taken by the head to move to the right track), rotational delay, (time it takes for the right sector to spin under the head), and transfer lime (time taken to read or write the data). Seek time is a significant component in I/O service time. Hence, the latency of a request depends on the location of the previous serviced request and as a result aggregate disk throughput depends on the order in which the requests are serviced. Due to this locational aspect, the problem of scheduling I/O requests is theoretically more challenging than location-unaware scheduling problems like CPU scheduling. Scheduling support is also needed for application of techniques that increase throughput at a higher level, such as the use of disk arrays. Disk scheduling is therefore an important problem in the SSP scenario.

New Disk Scheduling Method and Disk I/O Controller

Described below is a method of disk scheduling which differentiates QoS to achieve revenue maximization, together with a disk controller design which implements the method. The method can be used to take account of objectives such as delay minimization as well as revenue maximization. Described below is a specific embodiment of the invention which employs graph-theoretic techniques that use the 'no jumps' property (described below) to solve the above-described problem optimally in an offline setting. Adaptive solutions for handling new requests in an online scenario are also described below.

It will be apparent to a person skilled in the art that individual steps of the methods described below can be performed under the control of computer program code and that a variety of programming languages and coding implementations may be used to implement the methods and components described herein. Such computer programs are not intended to be limited to the specific example control flows described below, and steps described as if performed sequentially may be performed in parallel (and vice versa). One or more of the operations described in the context of a computer-program-controlled implementation could alternatively be performed by a hardware electronics component.

Some portions of the following description refer to 'algorithms' for performing operations on data within a computer memory. An algorithm is a self-consistent sequence of steps leading to a desired result. The steps are those requiring physical manipulations of physical quantities. Usually, these quantities take the form of electrical or magnetic signals capable of being stored, transferred, combined, compared, and otherwise manipulated. It is frequently convenient to refer to these signals as bits, values, elements, characters, numbers, or the like. It should be borne in mind, however, that the above and similar terms are to be associated with the appropriate physical quantities and are merely convenient labels applied to these quantities. Unless specifically stated otherwise, discussions within the present specification utilising terms such as "computing", "calculating", "determining", "comparing", "generating", "selecting", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers, or other such information storage, transmission or display devices.

The present specification also discloses apparatus for performing the operations of the methods, including components of a storage system, a dispatcher and a disk controller. Apparatus for implementing the invention may be specially constructed for the required purposes, or may comprise one or more general purpose computers or other devices selectively activated or reconfigured by computer programs stored in the computers or devices. The algorithms and methods described below are not inherently related to any particular computer hardware or other hardware apparatus. Various general purpose machines may be used with programs in accordance with the teachings herein. Alternatively, the construction of more specialised apparatus to perform the required method steps may be appropriate.

In addition, the present specification discloses a computer readable medium for storing a computer program for performing the operations of the methods. The computer readable medium is taken herein to include any transmission medium for communicating the computer program between a source and a destination. The transmission medium may include storage devices such as magnetic or optical disks, memory chips, or other storage devices suitable for interfacing with a general purpose computer. The transmission medium may also include a hard-wired medium such as exemplified by typical Internet-connected server computers, or a wireless medium such as exemplified in the GSM mobile telephone system.

Where steps or features in any of the accompanying drawings are referenced by the same reference numerals, those steps and/or features have the same or similar functions or operations in the context of the present description (unless the contrary intention appears).

Disk Controller Architecture and System Design

Figure 3:
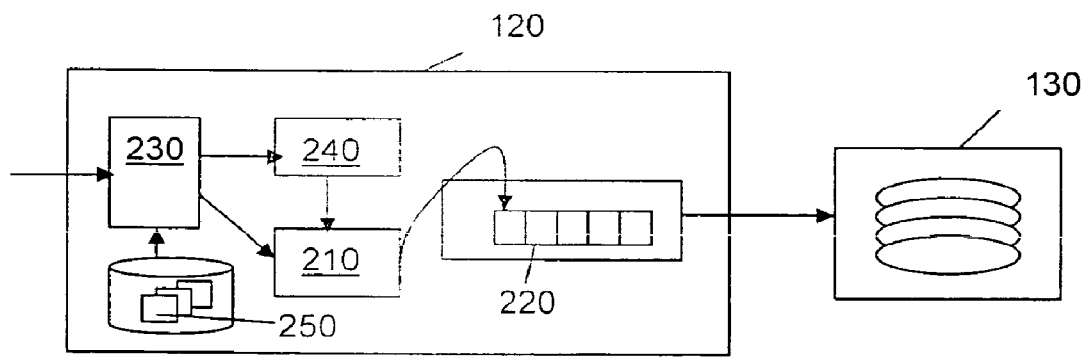
FIG. 3 shows a disk controller architecture, according to an embodiment of the invention.

FIG. 3 shows components of a disk controller 120 according to an embodiment of the invention. The controller receives incoming requests for disk input and output operations and uses a scheduler 210 to insert the requests in a queue 220 for processing by the target disk drive 130. A request classifier 230 on the input side of the scheduler 210 receives input requests and examines them to enable classification. The classifier uses attributes of the request (such as tag value, or a combination of SCSI initiator, target and device-specific logical unit number (LUN) identifiers) to identify an appropriate revenue function 250 to be used by the scheduler. The revenue function may be stored as a table of revenues that can be earned for different latency values. The request classifier 230 forwards the classified request, including information regarding the revenue function and other information needed for scheduling, to the scheduler 210.

The request classifier also sends information regarding the parameters of the request to a predictor 240. The predictor uses the parametric information to generate a prediction regarding future requests that the controller is likely to receive, and forwards the prediction to the scheduler 210. The scheduler applies its scheduling policy to the received requests, together with the prediction received from the predictor, to insert the requests at an appropriate position in the request queue. The disk drive 130 services requests from the head of the queue 220.

Algorithmic Formulation

Each stream $\Gamma_i$, accessing a disk is represented as:

$$\Gamma \langle \lambda_i, E(S)_i, E(S^2)_i, sratio_i, w_i, bratio_i, l_i \rangle$$

where $\lambda_i$ is the request arrival rate per second, $E(S)_i$ is the expected size of the data request, $E(S^2)_i$ is the second moment of the expected size of the data request, $sratio_i$ is a sequential-to-random ratio (see below), $w_i$ is the number of requests that arrive in a single burst (i.e. a defined short interval of each other), $bratio_i$ is the ratio of the number of "bursty" requests to the total number of requests of a stream i, and $l_i$ is the run length (see below). The "sequential-to-random ratio" is the ratio between requests that access a location contiguous to the location of a previous request ("sequential" requests) and requests which do not ("random" requests). The run length is defined as the expected number of consecutive requests that access locations that are close, but not necessary contiguous, to each other. Each request $r_j$ associated with any stream is represented as:

$$r \langle a_j, E(S)_j, R_j(d), \Gamma_j, loc_j \rangle$$

where $R_j(d)$ is the reward generated by the request if it is served with a delay of time d, $\Gamma_j$ is the stream with which each $r_j$ is associated, $a_j$ is the arrival time and $loc_j$ is the location on the disk that $r_j$ accesses. Throughout this description, the 'service time' of a request denotes the start time of the actual transfer of data for the request.

The inventors of the present invention have determined that a solution to the disk scheduling problem involves determining a processing sequence for disk I/O requests which maximizes the accumulated rewards achievable by processing all the requests. This involves controlling, for each request $r_i$, the time $t_i$ at which $r_i$ is serviced—where the rewards achievable for each (or at least some) of the requests are dependent on their respective service time $t_i$. This can be expressed as:

$$\max \sum_{i=1}^{n} R_i(t_i) \quad (1)$$

s.t. $t_i < \infty \; \forall_i$ $t_j \geq t_i \Rightarrow t_j \geq t_i + c(r_i, r_j) \; \forall r_i r_j$ where $c(r_i, r_j)$ is the sum of the time required to process $r_i$ and the time to reach $loc_j$ from $loc_i$, (i.e. the time taken to transfer the data needed for the request $r_i$ and the time for the disk read/write head to seek to the track where data for the next request $r_j$ resides, plus any rotational delay to bring the required track sector beneath the head).

A solution to the disk scheduling problem provides an ordered sequence of requests, referred to hereafter as a 'path'. Each solution (or equivalently a path) satisfies the condition that all the requests are served. Moreover, the optimal path is one that maximizes the SLA-based revenues (the sum of the rewards of all the requests, minus the sum of the penalties if these are calculated separately from rewards).

The reward for any request is represented as a function of the delay experienced by the request. In general, reward functions are non-increasing with increase in delay. In the following description of a provider-centric model, reward functions are used to provide differentiated QoS to customers according to the revenue generated by their requests. The notation used is that a reward $R_i(d)$ for any request $r_i$ served with latency d is the revenue that the service provider earns from her customer if she serves $r_i$ with delay d.

Alternatively, in a user-centric scenario, rewards may be formulated in a manner that reflects overall customer satisfaction, for example. The latency of individual requests may not be the only factor affecting revenues. In this example, if a storage service provider defines a target user satisfaction as 95% of the requests from all users being serviced within a defined deadline (maximum latency), the provider can identify customers for whom a significant number of requests recently missed their target deadline and respond by prioritizing future requests for that customer. This may allow the provider to achieve the target satisfaction and/or avoid loss of rewards. In a scenario aiming to minimize aggregate delay, a reward function in which rewards decrease linearly with delay may be used. A general reward function according to one embodiment of the invention allows the same algorithm to be applicable in diverse scenarios by appropriate changes in the reward function.

Different requests can have different reward functions in order to handle the scenario in which different customers have different Service Level Agreements (SLA) and SLA revenue. This also enables handling of a mixed-media workload where the different kinds of workload may have different utility (or equivalently revenue) functions. For example, a linearly decreasing reward function can be appropriate for some file access workloads. However, for a streaming media workload, the utility for a request that misses its deadline may be zero. Hence, the reward appropriate for such a workload is a step function. One embodiment of the invention for achieving reward-maximizing scheduling (see Equation (1) above) is able to handle the case where there are different reward functions for individual requests.

As described earlier, an embodiment of the invention for solving the scheduling problem set out in Equation (1) implements enhancements to a disk controller. The controller is designed to be independent of any specific revenue-based reward function—and so has the ability to implement a number of methods that solve the problem described in Equation (1). The controller includes a predictor component 240 and a request classifier component 230 in addition to the scheduler component 210, as shown in FIG. 3.

Figure 4:
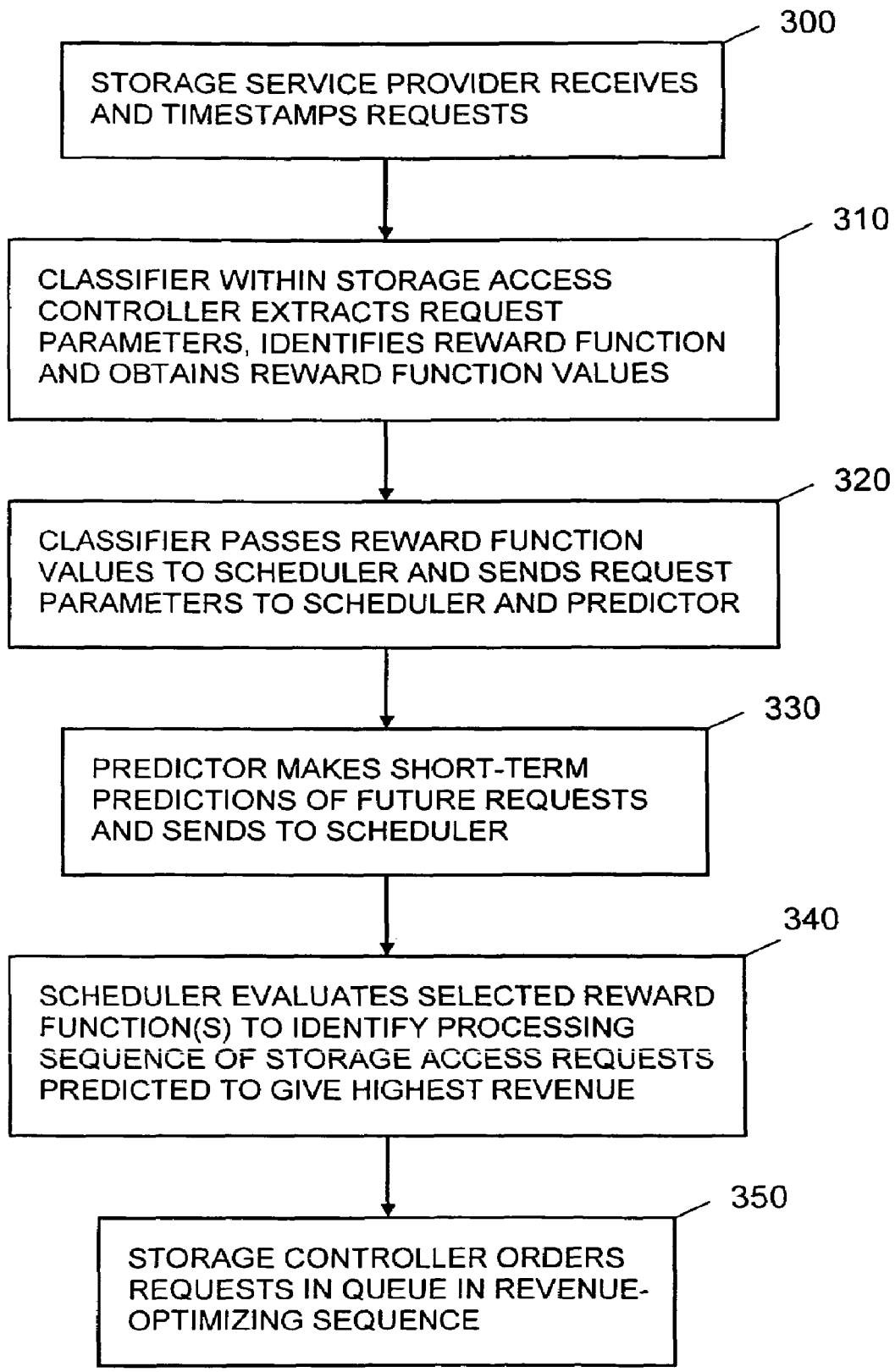
FIG. 4 shows steps of a method of disk I/O operation scheduling according to an embodiment of the invention.

The steps of a method implementing the invention are shown schematically in FIG. 4. Inputs to the method are a set of storage access (read and/or write) requests together with a set of parameters of the storage device (e.g. disk drive characteristics and an initial read/write head position, for estimating seek times and transfer times). Latency is calculated from the time of arrival of each request at the storage service provider's system, so each request is timestamped on receipt 300.

The request classifier 230 extracts 310 the parameters of the requests (data location, QOS type, request size, etc) that are needed as input to a scheduling algorithm. The request classifier uses a tag extracted from the request to identify the reward functions 250 associated with each request, obtains the reward function values from a table and then provides 320 the reward function values to the scheduler 210. The classifier passes extracted request parameters to the predictor 240 and to the scheduler 210.

The predictor 240 makes 330 a short-term forecast of the requests expected to arrive in the near future, and forwards the forecast to the scheduler so that the scheduler can make more informed decisions. Many suitable methods and predictors are available to predict the arrival rates of Web traffic. The predictor of the present embodiment uses time-series analysis of the stream of received requests to make short-term predictions for the arrival rate $\lambda_i$ of requests. The predictor uses request history to estimate $l_i$, $w_i$, $bratio_i$ and $sratio_i$. The predictor uses $l_i$, $\lambda_i$, $w_i$, $bratio_i$ to generate $a_j$ and $l_i$, $sratio_i$ to generate $loc_j$ for each request $r_j$. Such parameters can be calculated based on a history window. For example, to calculate sratio, a determination is made of the proportion of requests that access a location that is on the same track as a previous access. This ratio is the sratio. A count of the number of requests that arrive in a small time period, averaged over the history window, provides $w_i$. Similarly for the other parameters, known techniques can be used and many alternative techniques are within the scope of the invention. Disk location $loc_j$, can be predicted as follows: if the request is sequential, the location of the requested data is next to the previous accessed location on the track. If the request is random, the location of the requested data is selected uniformly at random on the disk. Whether or not the request is sequential or random is predicted based on the sratio, the ratio of sequential requests in any set of requests. Each second, $\lambda_i$ requests arrive at the disk, of which ($\lambda_i$ *sratio) requests are expected to be sequential, accessing a location close to the previous request from the stream. The remaining requests ((1−sratio)*$\lambda_i$) are expected to be randomly distributed over the disk.

Thus, as well as determining request-specific physical data locations on the disk for each received request, request-history analysis can be used to predict the data location of the predicted requests that have not yet been received.

The scheduler 210 implements a scheduling algorithm that uses some or all of the received information, and parameters of the disk drive, to determine 340 a processing sequence that is expected to maximize the SLA.—related revenue for the received and predicted set of requests. Example scheduling algorithms are described in detail below. In general, the scheduling problem involves evaluating one or more latency-dependent reward functions, for candidate sequences of requests, based on a predicted latency d for each request. Such a prediction can be performed using well-known disk models (to predict seek times and transfer times, plus a small adjustment for typical rotational delays). Known time-series analysis of the request history can be used to predict future requests. Additionally, certain properties of disk storage systems can be used to limit the number of candidate request sequences that need to be considered (as described below under the heading 'Scheduling Algorithm for Service Provider').

The scheduler takes account of all requests that have arrived but have not yet been served. The scheduler can also use predictions from the predictor 240 to take account of requests that are expected to arrive in the near future. The period considered to be the "near future" is itself a parameter that can vary according to the traffic forecaster used. A typical publicly available forecaster that uses time-series based analysis is suitable for predicting future requests. The storage access controller then orders 350 the received storage access requests in a queue according to the revenue-optimizing schedule.

Graph Formulation

Figure 5:
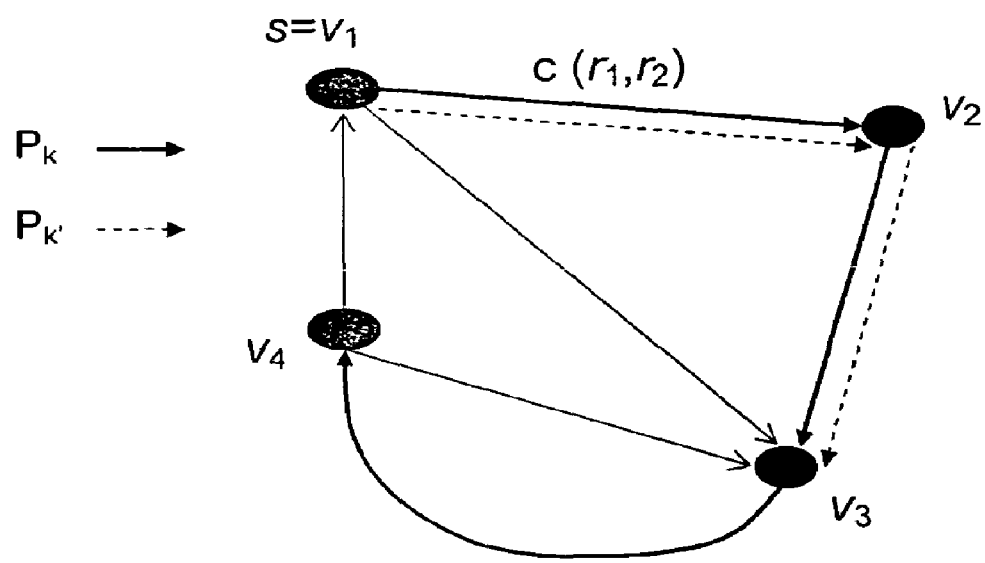
FIG. 5 is a graphical representation of a set of possible paths, comprising alternative sequences of requests, that may be evaluated according to an embodiment of the invention.

The disk scheduling problem described above with reference to Equation (1) can be mapped to the following graph problem. As shown in FIG. 5, a vertex $v_i$ within a graph may be introduced for every request $r_i$. The edge $e(v_i,v_j)$ has length (weight) equal to $c(r_i,r_j)$. The graph has a source node s that represents the initial location of the disk's read/write head. With every vertex $v_i$, we associate the reward function of $r_i$. For every path $P_k$ (from s to some vertex $v_i$) in the graph, the accumulated revenue loss $ARL(P_k)$ is defined as the reward that is lost by taking the path. This is represented as:

$$ARL(P_k)=R_i(0)-R_i(\delta)+ARL(P'_k) \quad (2)$$

where $\delta$ is the length of path $P_k$ and $P'_k$ is $P_k-v_i$, i.e. the subpath of $P_k$ that does not contain $v_i$. The solution to Equation (1) in this formulation is a path $P_o$ such that $P_o$ covers all the vertices and has the least ARL amongst all the paths that cover all vertices.

The above problem includes aspects of the 'Travelling Salesman Problem' (TSP), and both can be considered as minimization problems on a graph G whose solution is a path that covers all nodes in the graph G. The objective functions are however different in the two cases. The scheduling problem is more difficult than TSP because there is an accumulation element in the problem that is absent in TSP. To elaborate, in a TSP, the objective function $O(P_k)$ is $$O(P_k)=e(u_i,v_i)+O(P'_k) \quad (3)$$

where $u_i$ is the predecessor of $v_i$ in the path $P_k$. Hence, the increase in objective function is independent of $P'_k$.

In the present case, however, for a path that traverses a set of edges $E_k$, the general reward function R has a variable $$\delta = \sum_{e \in E_k} e,$$

in the objective function. Hence, the increase in the objective value depends on the delays accumulated throughout the path as well as some reward function R. For this reason, the disk scheduling problem appears more complex than TSP (and the Euclidean TSP is itself considered unlikely to be solvable by a polynomial algorithm (is considered 'NP-complete')). However, given the characteristics of a storage system, certain restrictions can be applied to the kind of graphs to be constructed. The restrictions on graphs are described below, together with a solution to the disk scheduling problem in a restricted graph.

Scheduling Algorithm for Service Provider

Described below is an off-line scenario in which the set of requests to be served is fixed and known when calculations are started. No new requests are allowed. The proposed algorithm yields an optimal schedule for processing the candidate requests in this case.

Certain properties of disk-based storage are taken into consideration to restrict the graphs that are compared. Even with recent improvements in disk drive technology, seek time continues to be the dominant component in the disk access time. The desirability of controlling seek time motivates the following restrictions on the scheduling algorithms:

When servicing a request accessing a track X, all other requests that access the same track X are serviced before moving to another track.

When there is a requirement to move from a first track $X_i$ to another track $X_j$, where i<j, all requests that access any of the intervening tracks ($X_{i+1}$ to $X_{j-1}$) are serviced during the move from $X_i$ to $X_j$.

This is referred to as a 'no jumps' property of track seeking. Most common scheduling algorithms (such as SCAN, LOOK, SSTF and their variants), satisfy this 'no jumps' property. Implementing the 'no jumps' property is likely to result in a relatively low overall latency due to the relatively low overall head movement compared with paths between requests which do not take account of the dominance of seek time. This approach ensures selection of a path with satisfactory disk utilization, and is unlikely to have a significant negative effect on the attempt to maximize revenues. Furthermore, the limitations on the allowed paths reduces the number of paths to be considered and simplifies the structure of each graph, reducing the processing overhead associated with calculating an optimum path.

The following are properties of such a simplified graph $G_S$ and optimal path $P_O$:

All the nodes in an original graph G that represent requests accessing the same track can be represented as a single node in the simplified graph $G_S$.

A node in $G_S$ is not visited more than once in the optimal path $P_O$. This is because all requests on one track are serviced at one go.

If $P_O$ traverses from a node i to a node j, and vice-versa, where i<j, $P_O$ visits all the unvisited nodes k, where i<k<j.

The last property is a consequence of the no jumps property. Together, these conditions imply that the size of $G_S$ depends only on the number of tracks in a disk and not on the number of outstanding requests. The no jumps condition leads to the following property on all paths in the graph.

Lemma 1: The set of nodes C covered by a path P (called the cover set) can be equivalently represented as {z, b}, where z is the last node in P and b is defined as arg $\max_v e(z, v) v \in C$.

Proof: From the definition of z and b, it can be shown that z and b are unique for any C. Therefore, in order to prove that the two representations C and {z,b} for a path P are equivalent, a check may be performed of whether there exists a unique set of nodes, C, for any {z,b}. If there exists a path P' and its cover set C'(≠C) is also represented by {z,b}, the two representations are not identical. Consider v'∈ C'−C. Note that if v'>b>z or z>b>v', then v' is the boundary of C'. Also, if b>v'>z or z<v'<b, then v'∈ C because of the no jumps property. Finally, if b>z>v' or v'>z>b, then z is not the last node in P'. This is because z should be covered in the subpath $P'_{v',b}$ from v' to b or $P'_{b,v'}$ from b to v'. Since both b and v' are covered, at least one of the subpaths exist in P'. Hence, there does not exist any such v' and C'=C.

Generalized Shortest Path Based Algorithm

One approach to solving the above-described problems involves collapsing an exponential number of possible paths into a polynomial number of path-classes, to find the path with the least objective function. The shortest path algorithm (SP) illustrates the idea.

Given a graph G(V,E), with a set of vertices V and a set of edges E, SP returns the shortest length path from a node, s, to some other node, z. At any time T, SP maintains a list of paths P, where each path $P_i$ is the shortest path from source s to node $v_i$ computed up until time T, SP picks up the shortest length path $P_k$ from P and computes the distance $\delta_{n(k)}$ from node s to neighbours of k (nodes n(k)) by following $P_k$. For each neighbour n(k), SP replaces the current path in P if $\delta_{n(k)}$ is less than length of $P_{n(k)}$. The algorithm terminates when $P_k$ has z as its destination node.

The algorithm for determining the shortest path can then be modified to calculate the ARL instead of length, and the final selection of a path from the list of paths P can be made to minimize the ARL as described above. In each iteration, the algorithm picks the path from P that has the least ARL. The algorithm terminates when the path picked, $P_k$, covers all the nodes. Hence, other than the destination nodes, a path maintains the information of the set of nodes that the path covers. The reason why the TSP problem cannot be solved using the shortest path algorithm is that the number of such cover sets is exponential. Moreover, the path should also maintain information about the length of the path to compute the ARL of the neighbours using Equation (2) above. However, referring to Lemma 1, only |V| number of cover sets for each destination node has to be considered—for the following reason. For each path with current, final or destination node z the boundary node b uniquely determines the nodes that are covered by the path. Since the number of such boundary nodes equal the number of nodes in the graph (=|V|), the number of paths needed to capture all cover sets (i.e. set of nodes covered by paths) is only |V| for any given current, final or destination node z. Moreover, there is no need to keep paths with excessive delays in P. The following lemma restricts the delay values that are needed to compute the path with the least ARL.

Definition 1: Let $\delta_{(z,b)}^{min}$ be the length of the shortest path (path with the least accumulated delay) and $\delta_{(z,b)}^{max}$ be the length of the longest path (path with the maximum accumulated delay) for a {z, b} pair. Slack Ω of a graph G(V,E) is defined as $\max_{ij \in V} \delta_{(i,j)}^{max} - \delta_{(i,j)}^{min}$.

Lemma 2: The total number of paths with distinct delay values needed to be maintained for any {z, b} pair is bounded by the slack $\Omega_G$ of the graph G. Moreover, there are no two paths with an equal accumulated delay and the same {z, b}. Finally, at any time T, if $\delta_{z,b}^{ARL}(T)$ is the delay of the path $P^{ARL}(T)$ with the least ARL for a {z, b} pair, then all paths $P_i$, maintained at time T, with the same {z, b} have accumulated delay $\delta_i < \delta_{z,b}^{ARL}(T)$ and $ARL_i < ARL(P^\delta(T))$, where $P^{\delta(T)}$ is the path with the least accumulated delay for a {z, b} pair.

Proof Note that there does not exist any path for a {z, b} pair that has length less than $\delta_{a,b}^{min}$. Also, note that $\delta_{a,b}^{ARL}(T) < \delta_{z,b}^{max}$. Hence, we only need to show that paths with accumulated delay $\delta_i \geq \delta_{z,b}^{ARL}(T)$, or with $ARL_i \geq ARL(P^\delta(T))$, are not needed for the computation of the path with the least ARL.

A path $P_i$ with delay $\delta_i \geq \delta_{z,b}^{ARL}(T)$ can be assumed to exist, that is part of the path with the least ARL, $P_{opt}$. In the case where the least ARL path is not unique, $P_{opt}$ can be defined as the path that has the minimum delay among all such least ARL paths. $P_i$ can be replaced with $P^{ARL}(T)$ in $P_{opt}$ and the delay reduced without increasing the overall ARL. Hence, $P_{opt}$ is not the optimal path. Similarly, assuming that $P_i$ has $ARL_i > ARL(P^\delta(T))$, $P_i$ can be replaced with $P^\delta(T)$ in $P_{opt}$ and the ARL decreased without increasing the delay for any node. Hence, no such $P_i$ exists. Finally, if there are two paths $P_i$ and $P_j$ with the same accumulated delay $\delta$ and $P_{opt}$ such that $ARL(P_i) \geq ARL(P_j)$, then $P_j$, can replace $P_i$ in $P_{opt}$ without increasing the ARL or accumulated delay.

Presented below is example pseudocode corresponding to a computer-program-implementable generalized shortest path algorithm GSP, based on the use of the properties of the graph to obtain a path P for the new graph $G_S$. The GSP algorithm satisfies the following properties:

P covers all the nodes in $G_S$.
P satisfies the no jumps property.
There does not exist another path P' such that P' covers all the nodes in $G_S$, P' satisfies the no jumps property and ARL(P)>ARL(P').

---

GSP Algorithm

Algorithm GSP
Path$P_o$ = {s,s,0,ø}
Add Po to P
for the path $P_i \in$ Pwith least ARL do
   if $P_i.z$ = final and $P_i.b$ = final
      return$P_i$
   end if
$P_i^c.z$ = min{$P_i.z, P_i.b$} −1
$P_i^c.b$ = max{$P_i.z, P_i.b$}
$P_i^c.\delta$ = $P_i.\delta$ + e($P_i.z, P_i^c.z$)
$P_i^c$. path = $P_i$.path + $P_i.z$
   if ARL($P_i^c$) < ARL(P{$P_i^c.z, P_i^c.b, P_i^c.\delta$,*})
      delete P{$P_i^c.z, P_i^c.b, P_i^c.\delta$*}from P
      add $P_i^c$ to P
   end if
$P_i^f.z$ = min{$P_i.z, P_i.b$}
$P_i^f.b$ = max{$P_i.z, P_i.b$} + 1
$P_i^f.\delta$ = $P_i.\delta$ + e($P_i.z, P_i^f.z$)
$P_i^f$.path = $P_i$.path + $P_i.z$
   if ARL($P_i^f$) < ARL(P{$P_i^f.z, P_i^f.b, P_i^f.\delta$,*})
      delete P{$P_i^f.z, P_i^f.b, P_i^f.\delta$*}from P
      add $P_i^f$ to P
   end if
end for
end algorithm GSP

---

The algorithm takes as input a source node s, a center node corresponding to the innermost track, a final node corresponding to the outermost track and $e(s_i, s_j)$ that represents the delay in moving from $s_i$ to $s_j$. The algorithm GSP returns a path P{z,b,δ,path} where d is the current node, b=arg max$_{si}$ e(z,$s_i$), δ is the accumulated delay in taking the path P and path is the sequence of nodes traversed.

Figure 6:
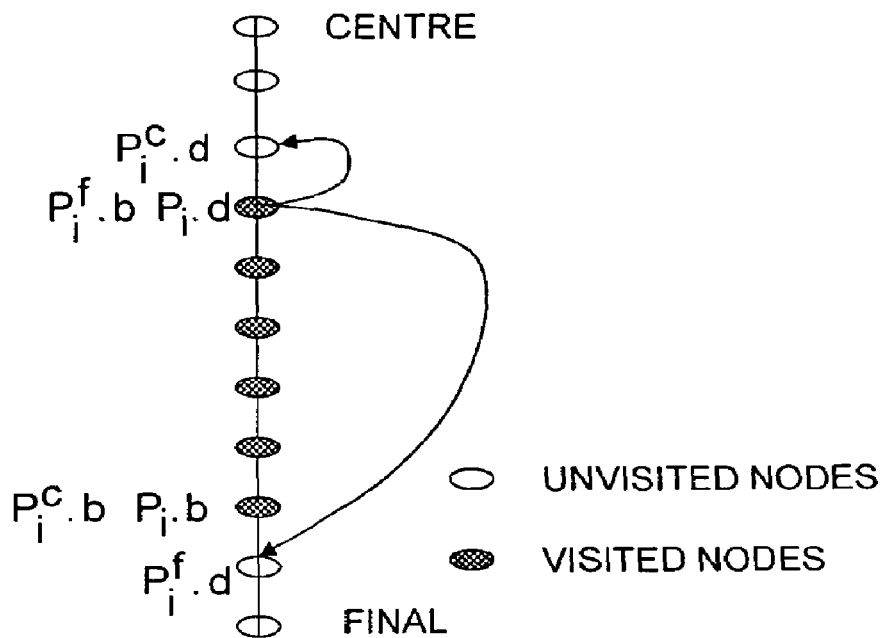
FIG. 6 shows the creation of new paths between nodes according to the GSP algorithm of the present invention.

A method implementing the GSP algorithm runs in the following manner. The method maintains a path $P_j$ for every combination of (i) current head position z (ii) boundary of the path b and (iii) accumulated delay value $\delta_i$ such that $\delta_i \langle P_{min}.\delta$, where $P_{min}$=arg min$_P$ARL(P{$z_i,b_i$,*}), i.e., $P_{min}$ is the least ARL path that has the same current node z and boundary node b as $P_j$. The path $P_j$ has the property that $P_j$ is the path with the least ARL for that combination of z,b,δ. The GSP algorithm keeps the paths in an order sorted by their ARLs, picks the path $P_i$ with the least ARL and visits its neighbours to construct new paths $P_i^c$ and $P_i^f$ as shown in FIG. 6. The GSP algorithm then adds the new paths to the set of paths P if the new paths satisfy the properties described earlier. The algorithm terminates whenever the path $P_i$ is such that it spans across all nodes. The algorithm needs to construct only two new paths because of the no jumps property of the graph described earlier. Hence, we have the main theorem.

Theorem 1: GSP returns the optimal schedule for the class of algorithms that follow the no jumps property.

The total time needed to run the algorithm is dependent on the size of P. More specifically, if P has k entries, then k log k is the minimum time needed for the algorithm. We now show that k is a polynomial in m, where m is the number of tracks.

Lemma 3: The maximum size of the set P is $m^2 \Omega_{Gs}$, where $\Omega_{Gs}$ is the slack of $G_S$.

Proof The proof involves counting the total number of paths that are kept by the algorithm. By Lemma 1, only $m^2$ different values of {z,b} are possible. Also, by Lemma 2, the total number of delay values needed for a every {z,b} pair in order to compute the least ARL path is less than $\Omega_{Gs}$. Hence, the maximum number of paths that are required to be kept are less than $m^2 \Omega G_S$.

The above lemma leads to the following result about the total running time of the algorithm.

Theorem 2: The running time of GSP is $O(m^2 \Omega_{Gs} \log(m\Omega_{Gs}))$.

Proof Consider each iteration of the 'for' loop. It is easy to verify that each iteration can be performed in O(log |P|) by using a Fibonacci heap to store the paths in P with the ARL as the key. (The minimum entry is obtained once, and a maximum of 2 insert and 2 delete operations are performed, in each iteration.) Also, note that whenever a path P is picked, with cover C and delay d, from P, there is no additional path P' in P with the same cover set C and delay d. Hence, the total number of iterations are, at most, $m^2 \Omega_{Gs}$ by Lemma 3, and the total time is $O(m^2 \Omega_{Gs} \log(m\Omega_{Gs}))$.

The running time of GSP potentially depends on the slack of the graph and it is important to have an estimate of the slack such graphs have. In experiments performed to verify GSP, the size of P never went beyond 2 $m^2$. Also, the average size of P was found to be 6 m. Note that for large number of requests (large n), this implies that the time required to find the shortest path is smaller than the time needed to construct the graph, which is O(n). Hence, the average running time is linear, which is very reasonable as even a random scheduling algorithm takes linear time.

Thus, it has been shown to be possible to circumvent a potential computational difficulty (associated with the TSP) by using the structure of the graph of the scheduling problem. Given a set of requests that are queued up, the method returns a schedule that maximizes the overall revenue generated by the served requests.

The above-described method may be adapted to apply the off-line algorithm to an on-line scenario where new requests can arrive at any time.

Online Shortest-Path-Based Scheduling Algorithm

Simple GSP (SGSP) Algorithm

A method using the GSP algorithm in an online scenario is described below. A queue Q of incoming requests is maintained and used to compute the schedule by applying the GSP algorithm. The graph G used by GSP to construct the schedule S is created from the requests in Q. The algorithm then serves the next request in S. After serving the request, it checks if new elements have been added to the queue. If new elements are added, the algorithm computes a new schedule S' from the graph G' that is based on the new state of the queue Q'.

This is the basic idea of Simple Generalized Shortest Path (SGSP) Algorithm. However, we use some simple observations to reduce the number of times GSP is called. Let $G_T$ be the graph at any time T and $G_{T'}$ be the graph at time T'. Let $RS_{TT'}$ be the set of requests serviced between T and T'. We compute the new least ARL path at time T' only if the graph $G_T$ and $G_{T'}$ are significantly different. To be more precise, the SGSP algorithm works as described in the following pseudocode.

SGSP Algorithm:

```
Algorithm SGSP
    G_old = createGraph(Q)
    while(true)
        G_new = createGraph(Q)
        if(different(G_new, G_old))
            S = GSP(G_new)
            G_old = G_new
        endif
        service request from S
    endwhile
end SGSP
```

The above algorithm uses a difference function to decide whether to recompute the schedule. Although a person skilled in the art will not require an exhaustive list of all the steps of the difference function, the following summary and example explain the solution. Assume that the schedule S returned by GSP serves a request r on a track $X_i$ and then moves to the periphery of the disk. If a new request r' accesses track $X_k$, where k>i, the new schedule S' based on a graph $G_{new}$ that incorporates r' would also move from track i to the periphery. Hence, the new schedule is computed only if the new request is opposite to the current direction of the head. Also, if the new graph $G_{new}$ is similar to $G_{old}$ in structure, the shortest path in $G_{new}$ is similar to that of $G_{old}$. Hence, the schedule is recomputed only when a significant number of new requests have been added.

In further incremental versions of the GSP algorithm, the previously computed schedule on $G_{old}$ is used to compute the new schedule on $G_{new}$. To take an example, if a new request arrives on a track $X_j$, the shortest path computation for paths that do not cover $X_j$ do not change and hence can be reused directly from the above-described computations.

Predictive GSP (PGSP) MethodolO2v

A number of studies have looked at the problem of forecasting aggregated traffic, especially in the Web domain. Techniques similar to the known techniques can be applied to the specific environment of a networked storage service provider to generate a short-term forecast for use in an embodiment of the present invention. Described below is a scheduling solution that uses prediction to incorporate information about the future while constructing the current schedule using GSP.

The following notation is used: let $T_c$ be the current time and $T_c$+t be the time at which a request $r_i$ arrives. Let G' be the graph based on the requests ($RS_{Tc}$) that have an arrival time less than $T_c$ and $r_i$. Let S' be the schedule returned by GSP and $r_i$ is served at time $T_c$+t' by S'. Note that if t'>t, then S' is the optimal schedule for request set $RS_{Tc} \cup r_i$. Hence, we can use prediction to compute such $r_i$ and include them in the current request set $RS_{Tc}$ to construct a graph G' that includes both nodes that arrive before time $T_c$ and those that arrive later than that.

The basic algorithm can remain the same as SGSP. The difference is in the computation of $G_{new}$. The graph constructed also incorporates predicted requests along with the requests that have arrived. The predictor makes a short-term forecast of requests expected to arrive, along with associated request parameters, in the manner described above. To account for errors in forecasting, a discount ratio ρ is specified, which represents the probability that the predicted request would arrive. Hence, before adding any predicted requests to the graph, the scheduler determines whether to add the request based on the probability ρ. The scheduler constructs $G_{new}$ in this fashion and can then proceed identically as SGSP for the iteration.

Experiments have been carried out to study the comparative performance of the above-described algorithms against some of the commonly employed disk scheduling algorithms. The experiments included studying the behavior of our algorithms with changes in rewards associated with the requests. A first step in the study included detailing the characteristics of workloads from different settings, including investigating the characteristics of multimedia workloads, file access workloads, and scientific workloads. In the experiments, a synthetic workload was used instead of real traces in order to study how the performance of the algorithms are effected by changes in workload parameters.

Experimental Setup

A model was created of a Seagate Cheetah 15K.3 disk drive (from Seagate Corporation) and its performance simulated using a Disksim disk simulator (as described in Ganger, G. R., Worthington, B. L., an Part, Y, N., "The Disksim Simulation Environment: Version 2.0 Reference Manual, *Technical Report CSE-TR*-358-98, 1999, Department of Electrical Engineering and Computer Science, University of Michigan.

The above-described request classifier and scheduler were implemented together with the Disksim simulator, which was used to service requests in FCFS manner (i.e. one at a time, in the order they appear in the request queue). A linearly decreasing reward function was used for all workloads other than multimedia workload. For multimedia workload, a step function was used to account for the fact that if a frame misses its deadline, the frame has no utility. Hence, the reward takes only 2 values R and 0. Jf a request is served within a latency D, the reward is R, otherwise 0. For a fair comparison with current scheduling algorithms that are reward-oblivious, the reward function was kept the same for all requests of the same workload type. Aggregated traffic is modelled as a Poisson process for all workloads other than multimedia, which is a constant rate process. The size of a request is typically constant or has low variance. Workload parameters and values used for the different workloads are tabulated in Table 1.

TABLE 1

| Workload | Arrival | RunLength | Size | Reward |
|---|---|---|---|---|
| File Access | Poisson | 2 | Normal | Linear |
| Scientific | Poisson | 100 | Constant | Linear |
| Multimedia | Constant | 50 | Normal | Step |

SCAN and SSTF scheduling policies were used to compare the performance of the algorithms. For the multimedia workload, SCAN—EDF was used to study the comparative performance of the algorithms. These algorithms represent a reasonable selection from the range of scheduling algorithms that optimize head movement (SCAN and its variants) or minimize average delay (SSTF and variants) or try to meet deadlines (EDF and its variants, such as SCAN—EDF). Although no direct comparison was made with a proportional fair scheduler (such as YFQ), SCAN provided such a comparison implicitly. This is because, in the setting where each request has the same reward function, a proportional share scheduler degenerates to SCAN as each stream has the same priority and so is assigned the same proportion of disk bandwidth. The results reported below are for the SGSP algorithm. Although the performance of PGSP is typically better than SGSP, PGSP can degenerate to SGSP by choosing the forecast discount ratio $\rho$ as 0.0.

Three sets of experiments were conducted to study the algorithms. In the first set, all the request streams were of the same type (i.e., all file access requests or all scientific requests or all multimedia requests). In the second set, multimedia streams were merged with file access streams. By allowing both homogenous and heterogeneous streams on the disk(s), it was possible to capture the case where a service provider hosts the same type of data on a disk as well as the case where she stores different types of data. Finally, experiments with different reward models in a mixed media setting were conducted and used to show how the reward model can be varied to give high priority to multimedia or to random workload.

Experimental Results

The SGSP algorithm achieved better revenue results than known alternatives in all kinds of workload studied (both homogenous and mixed media) outperforming the next best algorithm by at least 20% in all cases, with the performance improvement reaching as high as 80% in some cases.

The study also demonstrated the setting in which each known algorithm performs well. In a highly congested scenario with high sequentiality, SSTF achieves the performance closest to SGSP. This appears to be because SSTF is the least sensitive to decreases in traffic arrival rate. Hence, when the traffic is heavy, SSTF has the closest performance to SGSP. However, as traffic becomes lighter, SCAN is the algorithm with the performance closest to SGSP since the performance of SSTF does not increase significantly with a decrease in arrival rate. This behaviour of SSTF can be attributed to the fact that, at very heavy sequential traffic, SSTF only serves requests from few streams that access contiguous tracks and manages to obtain their rewards. Since the maximum obtainable reward is also low, SSTF performs close to SGSP. However, with lower arrival rate, the maximum obtainable reward increases but the behaviour of SSTF does not change and hence, its increase in performance fails to catch up with the increase in performance of other algorithms.

The third set of experiments demonstrated that the behaviour of SGSP can be changed as desired, by changing the reward model. For example, the relative priority of multimedia streams can be decreased and the reward obtained by the file access stream increased. Since reward is proportional to latency for this stream, such a change would effectively decrease the overall latency incurred by the file access trace by altering the reward model. Hence, appropriate modifications can be made to the reward model to increase the performance (e.g. reduce latency) of one or more streams. The change in performance of the file access stream can be seen to quickly approximate the optimal performance (saturating thereafter). Very close to the best performance possible for the file access stream is achievable with reasonably low reward ratios.

INDUSTRIAL APPLICABILITY

Outsourcing of computing infrastructure is a rapidly growing phenomenon and the new methods, computer programs and apparatus described above can be used to solve specific problems posed by this model. In particular, the problem of disk scheduling in a storage service provider scenario can be formulated as a profit maximization problem and the described scheduling algorithms based on graphical techniques can provide specific solutions with good experimental results.

The above-described offline algorithm has provided apparently optimal results within the class of seek-optimizing algorithms. Experiments suggest that the above-described online algorithms perform significantly better than a number of commonly used algorithms. The above-described prediction based algorithms have the potential for even better performance when used in conjunction with appropriate I/O traffic forecasting methods. Such new algorithms can be implemented to achieve diverse objectives including aggregate delay minimization, revenue maximization or providing differentiated QoS by changing the reward model.

What is claimed is:

1. A computer-implemented method for scheduling storage access requests, said method comprising:
   determining by a computer, by reference to Service Level Agreements (SLA)-based revenues achievable for processing storage access requests, a revenue-maximizing processing sequence for a plurality of storage access requests; and
   ordering by said computer the plurality of storage access requests in a schedule corresponding to the determined revenue-maximizing sequence,
   wherein said determining comprises evaluating a revenue function with reference to an estimated latency for each of the plurality of storage access requests, and
   wherein said revenue function is dependent only on said estimated latency and a non-unity weight associated with said storage access requests such that said revenue function is non-increasing with an increase in latency of said storage access requests,
   wherein the latency for each request is estimated using:
      an estimate of seek time for moving a read/write head of a disk drive to a disk track corresponding to a data location of a respective storage access request, wherein the seek time is estimated from characteristics of a respective disk drive, a current read/write head position, and a required read/write head position for performing a requested storage access operation;
      an estimated data transfer time determined according to a data size of each request and the disk drive characteristics; and
      an estimated rotational delay for rotating a disk sector, required by the storage access request, into a position required for operation of the read/write head.

2. The method of claim 1, wherein said latency of a particular storage access request is dependent on a location of a previous serviced storage access request.

3. The method of claim 1, wherein said determining comprises:
   for each of a set of candidate processing sequences, evaluating a latency-dependent revenue function to determine a latency-dependent loss of revenue for each request as compared with a maximum achievable revenue; and identifying a sequence within the set of candidate processing sequences having a minimum accumulated loss of revenue for the plurality of requests.

4. The method of claim 1, further comprising:

in response to receipt of additional storage access requests, repeating said determining and ordering steps.

5. The method of claim 1, further comprising:

analyzing a stream of data access requests and comparing with known request stream characteristics to predict future request;

wherein said determining includes determining a position in the sequence for the predicted future requests.

6. The method of claim 1, further comprising:

analyzing parameters of received data access requests to select a suitable latency-dependent revenue function from a plurality of revenue functions.

7. The method of claim 1, wherein said determining comprises determining a revenue-maximizing sequence subject to a condition that all received requests to access data on a particular disk track X are arranged consecutively in the sequence to ensure that requests to access data on a same disk track X are served consecutively before moving a read/write head to another track.

8. The method of claim 1, wherein said determining comprises determining a revenue-maximizing sequence subject to a condition that, when a read/write head moves from a first track $X_i$ and a second track $X_k$ during processing of the sequence of data access requests, all received requests to access data on an intervening track $X_j$ are processed before requests to access data on the second track $X_k$, for i<j<k and i>j>k.

9. A storage access controller comprising:

computer-readable storage media storing instructions to control a scheduler to determine, by reference to Service Level Agreements (SLA)-based revenues achievable for processing storage access requests, a revenue-maximizing processing sequence for a plurality of storage access requests and for ordering the plurality of storage access requests in a scheduled sequence corresponding to the determined revenue-maximizing sequence, wherein said scheduler is further adapted to evaluate a revenue function with reference to an estimated latency for each of the plurality of storage access requests, wherein said revenue function is dependent only on said estimated latency and a non-unity weight associated with said storage access requests such that said revenue function is non-increasing with an increase in latency of said storage access requests, and wherein the latency is estimated using an estimated rotational delay for rotating a disk sector, required by the storage access request, into a position required for operation of a read/write head based on characteristics of a respective disk drive.

10. The storage controller of claim 9, further comprising:

a predictor for analyzing a stream of data access requests and comparing with known request stream characteristics to predict future requests;

wherein the scheduler is adapted to determine a revenue-maximizing processing sequence that includes a position in the sequence for the predicted future requests.

11. The storage controller of claim 9, further comprising:

a classifier for analyzing parameters of received data access requests to select a suitable latency-dependent revenue function from a plurality of revenue functions.

12. A scheduler for a storage access controller, comprising:

computer-readable storage media storing instructions for determining, by reference to Service Level Agreements (SLA)-based revenues achievable for processing storage access requests, a revenue-maximizing processing sequence for a plurality of storage access requests; and means for ordering the plurality of storage access requests in a schedule corresponding to the determined revenue-maximizing sequence, wherein said instructions further evaluates a revenue function with reference to an estimated latency for each of the plurality of storage access requests, wherein said revenue function is dependent only on said estimated latency and a non-unity weight associated with said storage access requests such that said revenue function is non-increasing with an increase in latency of said storage access requests, and wherein the latency is estimated using an estimated rotational delay for rotating a disk sector, required by the storage access request, into a position required for operation of a read/write head based on characteristics of a respective disk drive.

13. A data processing apparatus comprising:

a data processing unit;

a data storage unit; and a storage access controller adapted to determine, by reference to Service Level Agreements (SLA)-based revenues achievable for processing storage access requests, a revenue-maximizing processing sequence for a plurality of storage access requests and for ordering the plurality of storage access requests in a scheduled sequence corresponding to the determined revenue-maximizing sequence, wherein said storage access controller is further adapted to evaluate a revenue function with reference to an estimated latency for each of the plurality of storage access requests, wherein said revenue function is dependent only on said estimated latency and a non-unity weight associated with said storage access requests such that said revenue function is non-increasing with an increase in latency of said storage access requests, and wherein the latency is estimated using an estimated rotational delay for rotating a disk sector, required by the storage access request, into a position required for operation of a read/write head based on characteristics of a respective disk drive.

14. A computer program storage medium readable by computer, tangibly embodying a program of instructions executable by the computer to perform a method of scheduling storage access requests, the method comprising:

determining, by reference to Service Level Agreements (SLA)-based revenues achievable for processing storage access requests, a revenue-maximizing processing sequence for a plurality of storage access requests; and ordering the plurality of storage access requests in a schedule corresponding to the determined revenue-maximizing sequence, wherein said determining comprises evaluating a revenue function with reference to an estimated latency for each of the plurality of storage access requests, wherein said revenue function is dependent only on said estimated latency and a non-unity weight associated with said storage access requests such that said revenue function is non-increasing with an increase in latency of said storage access requests, and wherein the latency is estimated using an estimated rotational delay for rotating a disk sector, required by the storage access request, into a position required for operation of a read/write head based on characteristics of a respective disk drive.

15. A method for operating a storage service, said method comprising:

maintaining a data store within a set of network-accessible data storage units;

receiving storage access requests for access to the data store;

scheduling received storage access requests by determining, by reference to Service Level Agreement (SLA)-based revenues achievable for processing storage access requests, a revenue-maximizing processing sequence for a plurality of storage access requests, and ordering the plurality of storage access requests in a schedule corresponding to the determined revenue-maximizing sequence, wherein said determining comprises evaluating a revenue function with reference to an estimated latency for each of the plurality of storage access requests, wherein said revenue function is dependent only on said estimated latency and a non-unity weight associated with said storage access requests such that said revenue function is non-increasing with an increase in latency of said storage access requests, and wherein the latency is estimated using an estimated rotational delay for rotating a disk sector, required by the storage access request, into a position required for operation of a read/write head based on characteristics of a respective disk drive.

16. A method for scheduling storage access requests, said method comprising:

determining, by reference to Service Level Agreements (SLA)-based reward parameters, a reward-function-maximizing processing sequence for a plurality of storage access requests; and ordering the plurality of storage access requests in a schedule corresponding to the determined reward-function-maximizing sequence, wherein said determining comprises evaluating a revenue function with reference to an estimated latency for each of the plurality of storage access requests, wherein said revenue function is dependent only on said estimated latency and a non-unity weight associated with said storage access requests such that said revenue function is non-increasing with an increase in latency of said storage access requests, and wherein the latency is estimated using an estimated rotational delay for rotating a disk sector, required by the storage access request, into a position required for operation of a read/write head based on characteristics of a respective disk drive.

17. The method of claim 16, wherein the reward parameters include measurable customer satisfaction parameters.

18. The method of claim 17, wherein the Service Level Agreements (SLA)-based reward parameters include reward parameters for a plurality of reward functions and said determining comprises evaluating the plurality of reward functions and aggregating reward values for the plurality of reward functions.

19. The method of claim 18, wherein the plurality of reward functions include a latency-dependent revenue function and an aggregate latency function and said determining comprises determining a processing sequence to maximize revenues within the constraints of an acceptable aggregate latency.

* * * * *